United States Patent
Liu et al.

(10) Patent No.: US 10,656,443 B2
(45) Date of Patent: May 19, 2020

(54) METHOD AND APPARATUS OF SURFACE-INCIDENT, PLASMON-ENHANCED MULTIPLE QUANTUM WELL MODULATORS AND OPTICAL COUPLING THEREON

(71) Applicants: The Trustees of Dartmouth College, Hanover, NH (US); LaXense Inc., Walnut, CA (US); Massachusetts Institute of Technology, Cambridge, MA (US)

(72) Inventors: Jifeng Liu, Hanover, NH (US); Xiaoxin Wang, Hanover, NH (US); Juejun Hu, Newton, MA (US); Xiaochen Sun, Chino Hills, CA (US); Tian Gu, Fairfax, VA (US)

(73) Assignees: THE TRUSTEES OF DARTMOUTH COLLEGE, Hanover, NH (US); LAXENSE INC., Walnut, CA (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 15/923,986

(22) Filed: Mar. 16, 2018

(65) Prior Publication Data
US 2018/0267339 A1 Sep. 20, 2018

Related U.S. Application Data

(60) Provisional application No. 62/472,536, filed on Mar. 16, 2017.

(51) Int. Cl.
*G02F 1/017* (2006.01)
*G02F 1/015* (2006.01)

(52) U.S. Cl.
CPC ...... *G02F 1/017* (2013.01); *G02F 2001/0151* (2013.01); *G02F 2001/0157* (2013.01);
(Continued)

(58) Field of Classification Search
CPC ............... G02F 1/017; G02F 2202/101; G02F 2001/0151; G02F 2202/108; G02F 2203/10; G02F 2001/0157
(Continued)

(56) References Cited

U.S. PATENT DOCUMENTS 6,812,495 B2 11/2004 Wada et al.
6,946,318 B2 9/2005 Wada et al.
(Continued)

OTHER PUBLICATIONS

Altug et al. (2006) "Ultrafast photonic crystal nanocavity laser," Nature Physics, vol. 2, pp. 484-488.
(Continued)

*Primary Examiner* — Tuyen Tra
(74) *Attorney, Agent, or Firm* — Lathrop GPM LLP

(57) ABSTRACT

An optical interconnect system has first and second waveguides each with wedge-shaped cross-section at a first end, disposed over an optical modulator. The optical modulator is a surface-plasmon multi quantum well (SP-MQW) modulator, the first waveguide an input waveguide and the second waveguide configured an output waveguide. In embodiments the SP-MQW modulator has multiple semiconductor layers disposed atop a lower metal layer between 10 and 300 nanometers thick and configured such that incident light is reflected at the lower metal layer unless a voltage is applied to the semiconductor layers, when incident light is coupled into a surface plasmon mode in the lower metal layer.

8 Claims, 11 Drawing Sheets

(52) U.S. Cl.
CPC .. *G02F 2202/101* (2013.01); *G02F 2202/108* (2013.01); *G02F 2203/10* (2013.01)

(58) Field of Classification Search
USPC .......................... 359/237, 238, 240, 245, 263
See application file for complete search history.

(56) References Cited

U.S. PATENT DOCUMENTS

| | | | |
|---|---|---|---|
| 7,266,263 B2 | 9/2007 | Ahn et al. | |
| 7,305,157 B2 | 12/2007 | Ahn et al. | |
| 7,415,058 B2 | 8/2008 | Hu et al. | |
| 7,447,410 B2 | 11/2008 | Agarwal et al. | |
| 7,596,158 B2 | 9/2009 | Liu et al. | |
| 7,599,584 B2 | 10/2009 | Hu et al. | |
| 7,801,406 B2 | 9/2010 | Pan et al. | |
| 7,840,099 B2 | 11/2010 | Pan et al. | |
| 7,872,233 B2 | 1/2011 | Hu et al. | |
| 8,115,203 B2 | 2/2012 | Hu et al. | |
| 8,203,155 B2 | 6/2012 | Wang et al. | |
| 8,242,480 B2 | 8/2012 | Kimerling et al. | |
| 8,798,410 B2 | 8/2014 | Feng et al. | |
| 8,831,049 B2 | 9/2014 | Feng et al. | |
| 8,837,877 B2 | 9/2014 | Kimerling et al. | |
| 8,928,883 B1 | 1/2015 | Jaworski et al. | |
| 9,134,490 B2 | 9/2015 | Feng et al. | |
| 9,323,011 B1 | 4/2016 | Feng et al. | |
| 9,323,012 B1 | 4/2016 | Sun et al. | |
| 9,323,079 B1 | 4/2016 | Feng et al. | |
| 9,356,171 B2 | 5/2016 | Liu et al. | |
| 2012/0106890 A1* | 5/2012 | Gu .................... | G02B 6/4214 385/14 |

OTHER PUBLICATIONS

Anderson et al. (2010) "Ultra-low power modulators using MOS depletion in a high-Q SiO 2-clad silicon 2-D photonic crystal resonator," Optics Express, vol. 18, pp. 19129-19140.
Balamurugan et al. (2008) "A scalable 5-15 Gbps, 14-75 mW low-power I/O transceiver in 65 nm CMOS," IEEE Journal of Solid-State Circuits, vol. 43, pp. 1010-1019.
Batten et al. (2008) "Building manycore processor-to-dram networks with monolithic silicon photonics," in 2008 16th IEEE Symposium on High Performance Interconnects, pp. 21-30.
Bi et al. (2011) "On-chip optical isolation in monolithically integrated nonreciprocal optical resonators," Nat. Photonics, vol. 5, pp. 758-762.
Bi et al. (2013) "Magneto-optical thin films for on-chip monolithic integration of non-reciprocal photonic devices," Materials, vol. 6, pp. 5094-5117.
Bona et al. (2004) "Characterization of parallel optical-interconnect waveguides integrated on a printed circuit board," Photonics Europe, Proceedings of SPIE vol. 5453, pp. 134-141.
Bosman et al. (2006) "Optical connections on flexible substrates," Photonics Europe, pp. 618506-618506-8.
Cai et al. (2008) "Optical absorption in transparent PDMS materials applied for multimode waveguides fabrication," Optical Materials, vol. 30, pp. 1157-1161.
Cai et al. (2009) "Compact, high-speed and power-efficient electrooptic plasmonic modulators," Nano Letters, vol. 9, pp. 4403-4411.
Canciamilla et al. (2011) "Photo-induced trimming of coupled ring-resonator filters and delay lines in As2S3chalcogenide glass," Opt. Lett., vol. 36, pp. 4000-4002.
Canyon Materials, Inc. "Guide to Gray Scale Photolithography and Mass Fabrication of 3D Microstructures". (available online at: http://www.canyonmaterials.com/grayscale_res.html).
Carbaugh et al. (2015) "Photolithography with polymethyl methacrylate (PMMA)," Semiconductor Science and Technology, vol. 31, 10 pp.
Carlie et al. (2010) "Integrated chalcogenide waveguide resonators for mid-IR sensing: Leveraging material properties to meet fabrication challenges," Opt. Express 18, pp. 26728-26743.

Chen et al. (2000) "Fully embedded board-level guided-wave optoelectronic interconnects," Proceedings of the IEEE, vol. 88, pp. 780-793.
Chen et al. (2014) "Heterogeneously integrated silicon photonics for the mid-infrared and spectroscopic sensing," ACS Nano 8, pp. 6955-6961.
Coteus et al. (2013) "Packaging the ibm blue gene/q supercomputer," IBM Journal of Research and Development, vol. 57, 13 pp.
Dangel et al. (2007) "Prospects of a polymer-waveguide-based board-level optical interconnect technology," in Signal Propagation on Interconnects, 2007. SPI 2007 IEEE, 4 pp.
Dangel et al. (2015) "Polymer waveguides for electro-optical integration in data centers and high-performance computers," Optics Express, vol. 23, pp. 4736-4750.
Däschner et al. (1997) "Cost-effective mass fabrication of multilevel diffractive optical elements by use of a single optical exposure with a gray-scale mask on high-energy beam-sensitive glass," Applied Optics, vol. 36, No. 20, 6 pp.
Dillon et al. (2008) "Fiber-to-waveguide coupler based on the parabolic reflector," Optics Letters, vol. 33, pp. 896-898.
Dionne et al. (2009) "PlasMOStor: a metal-oxide-Si field effect plasmonic modulator," Nano Letters, vol. 9, pp. 897-902.
Dong et al. (2009) "Low V pp, ultralow-energy, compact, high-speed silicon electro-optic modulator," Optics Express, vol. 17, pp. 22484-22490.
Du et al. (2016) "Low-loss photonic device in Ge—Sb—S chalcogenide glass," Opt. Lett. 41, pp. 3090-3093.
Duan et al. (2014) "Hybrid III--V on Silicon Lasers for Photonic Integrated Circuits on Silicon," IEEE Journal of selected topics in quantum electronics, vol. 20, pp. 158-170.
E. Roth et al. (2006) "1550nm optical interconnect transceiver with low voltage electroabsorption modulators flip-chip bonded to 90nm CMOS," Optical Fiber Communication Conference, 3 pp.
Eldada (2002) "Polymer integrated optics: promise versus practicality," in Symposium on Integrated Optoelectronic Devices, pp. 11-22.
Eldada et al. (2000) "Advances in polymer integrated optics," IEEE Journal of selected topics in quantum electronics, vol. 6, pp. 54-68.
Englund et al. (2008) "Ultrafast photonic crystal lasers," Laser & Photonics Reviews, vol. 2, pp. 264-274.
Fang et al. (2006) "Electrically pumped hybrid AlGaInAs-silicon evanescent laser," Optics Express, vol. 14, pp. 9203-9210.
Feng et al. (2012) "High speed GeSi electro-absorption modulator at 1550 nm wavelength on SOI waveguide," Optics Express, vol. 20, pp. 22224-22232.
Field et al. (2007) "Process cost modeling: strategic engineering and economic evaluation of materials technologies," JOM, vol. 59, pp. 21-32.
Fuchs et al. (2006) "Process-based cost modeling of photonics manufacture: the cost competitiveness of monolithic integration of a 1550-nm DFB laser and an electroabsorptive modulator on an InP platform," Journal of Lightwave Technology, vol. 24, No. 8, 15 pp.
Fuchs et al. (2011) "The future of silicon photonics: Not so fast? Insights from 100G ethernet LAN transceivers," Journal of Lightwave Technology, vol. 29, pp. 2319-2326.
Gan et al. (2006) "Pb-free microjoints (50/spl mu/m pitch) for the next generation microsystems: the fabrication, assembly and characterization," in 56th Electronic Components and Tech, 6 pp.
Gimkiewicz et al. (1999) "Fabrication of microprisms for planar optical interconnections by use of analog gray-scale lithography with high-energy-beam—sensitive glass," Applied Optics, vol. 38, 5 pp.
Goossen et al. (1995) "GaAs MQW modulators integrated with silicon CMOS," IEEE Photonics Technology Letters, vol. 7, pp. 360-362.
Gu et al. (2013) "Chip-level multiple quantum well modulator-based optical interconnects," Journal of Lightwave Technology, vol. 31, pp. 4166-4174.
Han et al. (2016) "On-chip chalcogenide glass waveguide-integrated mid-infrared PbTe detectors," Appl. Phys. Lett.109, 3 pp.
Haney (2012) "Chip-scale integrated optical interconnects: a key enabler for future high-performance computing," SPIE OPTO, pp. 82670X-82670X-12.

(56) References Cited

OTHER PUBLICATIONS

He et al. (2013) "A high-efficiency nonuniform grating coupler realized with 248-nm optical lithography," IEEE Photonics Technology Letters, vol. 25, pp. 1358-1361.
Ho et al. (2013) "Silicon photonic interconnects for large-scale computer systems," IEEE Micro, pp. 68-78.
IPC-TM-650 Test Methods Manual, The Institute for Interconnecting and Packaging Electronic Circuits, 3 pp. [Available online at: http://www.ipc.org/4.0_Knowledge/4.1_Standards/test/2.4.3.1c.pdf].
Innovative Solutions for 3D Precision Manufacturing (2007) "Photonic Professional GT2," 4 pp. [available at: http://www.nanoscribe.de/en/products/photonic-professional-gt/].
3D/2D Maxwell's Solver for Nanophotonic Devices, 6 pp. [available online at: https://www.lumerical.com/tcad-products/fdtd/].
Hu et al. (2009) "Design guidelines for optical resonator biochemical sensors," Journal of Optics Society of American B, 26(5), pp. 1032-1041.
Hu et al. (2013) "Flexible integrated photonics: where materials, mechanics and optics meet [Invited]," Optical Materials Express, vol. 3, pp. 1313-1331.
Hu et al. (2015) "Chalcogenide glass microphotonics: Stepping into the spotlight," Am. Ceram. Soc. Bull., vol. 94, pp. 24-29.
Ioannides et al. (2014) "Approaches to mitigate polymer-core loss in plastic optical fibers: a review," Materials Research Express, vol. 1, 34 pp.
JDSU (2012) "JDSU 850 nm 10 G connectorized transmit optical sub-assembly (TOSA)." 6 pp. (Available online: http://www.jdsu.com/ProductLiterature/pl-xxd-00-s40-cx-ds-oc-ae.pdf.
Jelley et al. (1990) "A semi-empirical model for electroabsorption in GaAs/AlGaAs multiple quantum well modulator structures," IEEE journal of quantum electronics, vol. 26, pp. 296-304.
Kirchain et al. (2001) "Process-based cost modeling: understanding the economics of technical decisions," Encyclopedia of Materials Science and Engineering, vol. 2, pp. 1718-1727.
Koch et al. (2011) "Energy scaling in silicon photonic data encoding," in 8th IEEE International Conference on Group IV Photonics, GFP 2011, 3 pp.
Kodama et al. (2004) "500 Gbit/s optical gate monolithically integrating photodiode and electroabsorption modulator," Electronics Letters, vol. 40, 2 pp.
Krishnamoorthy et al. (1996) "Scaling optoelectronic-VLSI circuits into the 21st century: a technology roadmap," IEEE Journal of Selected Topics in Quantum Electronics, vol. 2, pp. 55-76.
Krishnamoorthy et al. (2009) "Computer systems based on silicon photonic interconnects," Proceedings of the IEEE, vol. 97, pp. 1337-1361.
Kuchta et al. (2013) "A 56.1 Gb/s NRZ modulated 850nm VCSEL-based optical link," Optical Fiber Communication Conference, 3 pp.
Lamponi et al. (2012) "Low-threshold heterogeneously integrated InP/SOI lasers with a double adiabatic taper coupler," IEEE photonics technology letters, vol. 24, pp. 76-78.
Lee et al. (2006) "Recent developments in the use of two-photon polymerization in precise 2D and 3D microfabrications," Polymers for advanced technologies, vol. 17, pp. 72-82.
Lee et al. (2010) "Monolithic chip-to-chip WDM optical proximity coupler utilizing echelle grating multiplexer/demultiplexer integrated with micro mirrors built on SOI platform," in IEEE Photo, 2 pp.
Lee et al. (2015) "Demonstration of 12.2% wall plug efficiency in uncooled single mode external-cavity tunable SI/III-V hybrid laser," Optics Express, vol. 23, pp. 12079-12088.
Levenson (1994) "All-glass material for direct-write photomasks," Solid State Technology, vol. 37, pp. 28-30.
Li et al. (2010) "Ultralow-power silicon photonic interconnect for high-performance computing systems," OPTO, vol. 7607, pp. 760703-760703-15.
Li et al. (2012) "Multicore fiber for optical interconnect applications," Opto-Electronics and Communications Conference (OECC), 2012 17th, pp. 564-565.
Li et al. (2013) "A fully-integrated flexible photonic platform for chip-to-chip optical interconnects," Journal of Lightwave Technology, vol. 31, pp. 4080-4086.
Li et al. (2013) "A Fully-integrated Flexible Photonic Platform for Chip-to-chip Optical Interconnects," J. Lightwave Technol. 31, pp. 4080-4086.
Li et al. (2013) "Low temperature growth of high crystallinity GeSn on amorphous layers for advanced optoelectronics," Optical Materials Express, vol. 3, pp. 1385-1396.
Li et al. (2014) "Chip-to-chip optical interconnects based on flexible integrated photonics," in SPIE OPTO, pp. 89910T-89910T-8.
Li et al. (2014) "Integrated flexible chalcogenide glass photonic devices," Nature Photonics, vol. 8, pp. 643-649.
Li et al. (2014) "Pseudo single crystal, direct-band-gap Ge0.89Sn0.11 on amorphous dielectric layers towards monolithic 3D photonic integration," Applied Physics Letters, vol. 105, 4 pp.
Li et al. (2015) "Foldable and Cytocompatible Sol-gel TiO2 Photonics," Scientific Reports, vol. 5, 10 pp.
Li et al. (2016) "Highly effective strain-induced band-engineering of (111) oriented, direct-gap GeSn crystallized on amorphous SiO2 layers," Applied Physics Letters, vol. 108, 6 pp.
Liang et al. (2010) "Hybrid integrated platforms for silicon photonics," Materials, vol. 3, pp. 1782-1802.
Lin et al. (2011) "Ultra-compact, broadband slot waveguide polarization splitter," Appl. Phys. Lett. 98, 3 pp.
Lin et al. (2013) "Breaking the energy-bandwidth limit of electrooptic modulators: theory and a device proposal," Journal of Lightwave Technology, vol. 31, pp. 4029-4036.
Lin et al. (2013) "Breaking the energy-bandwidth limit of electro-optic modulators: theory and a device proposal," J. Lightwave Technol., 31, pp. 4029-4036.
Lin et al. (2013) "Demonstration of mid-infrared waveguide photonic crystal cavities," Opt. Lett., vol. 38, pp. 2779-2782.
Lin et al. (2015) "Diffractive broadband coupling into high-Q resonant cavities," Opt. Lett., 40, pp. 2377-2380.
Liu (2014) "Monolithically Integrated Ge-on-Si Active Photonics," Photonics, vol. 1, pp. 162-197.
Liu (2015) Chapter 9: "Ge and GeSi Electroabsorption Modulators," in the book: Photonics and electronics with Germanium, Wiley, 27 pp.
Liu et al. (2007) "Design of monolithically integrated GeSi electroabsorption modulators and photodetectors on an SOI platform," Optics Express, vol. 15, No. 2, 6 pp.
Liu et al. (2007) "Tensile-strained, n-type Ge as a gain medium for monolithic laser integration on Si," Optics Express, vol. 15, 6 pp.
Liu et al. (2008) "Optoelectronic integration of polymer waveguide array and metal-semiconductor-metal photodetector through micromirror couplers," IEEE Photonics Technology Letters, vol. 13, pp. 355-357.
Liu et al. (2008) "Waveguide-integrated, ultra-low energy GeSi electro-absorption modulators," Nature Photonics 2, 20 pp.
Liu et al. (2009) "Direct-gap optical gain of Ge on Si at room temperature," Optics Letters, 34(11), pp. 1738-1740.
Liu et al. (2010) "Ge-on-Si laser operating at room temperature," Optics Letters, vol. 35, No. 5, pp. 679-681.
Liu et al. (2012) "Ge-on-Si Optoelectronics", Thin Solid Films 520, vol. 3354, 7 pp.
Liu et al. (2012) "Monolithic Ge-on-Si lasers for large-scale electronic-photonic integration," Semiconductor Science and Technology (invited paper for the Special Issue on the 50th Anniversary of Diode Lasers, Editors' Highlight of 2012) vol. 27, 13 pp.
Ma et al. (2002) "Polymer-Based Optical Waveguides: Materials, Processing, and Devices," Advanced Materials, vol. 14, pp. 1339-1365.
Manolatou et al. (2001) "Compact mode-size converters for efficient coupling between fibers and integrated optical waveguides," 2001 IEEE in Advanced Semiconductor Lasers and Applications/Ultraviolet and Blue Lasers and Their Applications, 2 pp.
McFadden et al. (2006) "Multiscale free-space optical interconnects for intrachip global communication: motivation, analysis, and experimental validation," Applied Optics, vol. 45, 9 pp.
Michel et al. (2010) "High-Performance Ge-on-Si Photodetectors" Nature Photonics, vol. 4, 8 pp.

(56) References Cited

OTHER PUBLICATIONS

Miller (2013) "Attojoule optoelectronics—Why and how," 2013 IEEE Photonics Society Summer Topical Meeting Series, 2 pp.
Miller et al. (1985) "Electric field dependence of optical absorption near the band gap of quantum-well structures," Physical Review B, vol. 32, 18 pp.
Miller (2010) "Device Requirements for Optical Interconnects to CMOS Silicon Chips," in Photonics in Switching, 2010, p. PMB3, 1 pp.
Moynihan et al. (2003) "Hybrid inorganic-organic aqueous base compatible waveguide materials for optical interconnect applications," Proceedings of SPIE vol. 5212 Linear and Nonlinear Optics of Organic Materials III, 11 pp.
Nozaki et al. (2013) "InGaAs nano-photodetectors based on photonic crystal waveguide including ultracompact buried heterostructure," Optics Express, vol. 21, pp. 19022-19028.
Ohrt et al. (2012) "Fidelity of soft nano-imprint lithographic replication of polymer masters fabricated by two-photon polymerization," The International Journal of Advanced Manufacturing Tech , 6 pp.
Padmaraju et al. (2012) "Thermal stabilization of a microring modulator using feedback control," Optics Express, vol. 20, pp. 27999-28008.
Poulton et al. (2007) "A 14-mW 6.25-Gb/s transceiver in 90-nm CMOS," IEEE Journal of Solid-State Circuits, vol. 42, pp. 2745-2757.
Raether (2013) "Surface plasmons on smooth and rough surfaces," Chapters 2.1-2.7, Springer-Verlag Berlin An, 14 pp.
Raghunathan et al. (2010) "Athermal operation of silicon waveguides: spectral, second order and footprint dependencies," Opt. Express, vol. 18, pp. 17631-17639.
Roelkens et al. (2006 "Adhesive Bonding of InP/InGaAsP Dies to Processed Silicon-On-Insulator Wafers using DVS-bis-Benzocyclobutene," Journal of the electrochemical Society, vol. 153, 5 pp.
Roelkens et al. (2007) "III-V/Si photonics by die-to-wafer bonding," Materials Today, vol. 10, pp. 36-43.
Schares et al. (2006) "Terabus: Terabit/second-class card-level optical interconnect technologies," IEEE Journal of Selected Topics in Quantum Electronics, vol. 12, pp. 1032-1044.
Sheng et al. (2011) "Design and non-lithographic fabrication of light trapping structures for thin film silicon solar cells," Advanced Materials, vol. 23, 5 pp.
Singh et al. (2014) "Mid-infrared materials and devices on a Si platform for optical sensing," Sci. Tech. Adv. Mater., vol. 15, 15 pp.
Slocum et al. (2003) "Precision passive mechanical alignment of wafers," Journal of Microelectromechanical Systems, vol. 12, pp. 826-834.
Sorger et al. (2012) "Toward integrated plasmonic circuits," MRS bulletin, vol. 37, pp. 728-738.
Stievater et al. (2004) "A surface-normal coupled-quantum-well modulator at 1.55 microns," Conference on Lasers and Electro-Optics, 3 pp.
Sun et al. (2006) "Multispectral pixel performance using a 1-D photonic crystal design," Applied Physics Letters, 89(22), 3 pp.
Sun et al. (2009) "Direct gap photoluminescence of n-type tensile-strained Ge-on-Si," Applied Physics Letters, vol. 95, 3 pp.
Sun et al. (2009) "Room temperature direct bandgap electroluminesence from Ge-on-Si light emitting diodes," Optics Letters, 34(8), pp. 1198-1200.
Sun et al. (2010) "Towards a germanium laser for integrated silicon photonics," IEEE Journal of Selected Topics in Quantum Electronics, 16(1), 9 pp.
Swatowski et al. (2013) "Flexible, stable, and easily processable optical silicones for low loss polymer waveguides," in SPIE OPTO, pp. 862205-862205-11.
Takeda et al. (2013) "Few-fJ/bit data transmissions using directly modulated lambda-scale embedded active region photonic-crystal lasers," Nature Photonics, vol. 7, pp. 569-575.
Tan et al. (2013) "Optical interconnects for high-performance computing systems," IEEE Micro, vol. 33, pp. 14-21.
Tanaka et al. (2012) "High-output-power, single-wavelength silicon hybrid laser using precise flip-chip bonding technology," Optics Express, vol. 20, pp. 28057-28069.
Tang et al. (2008) "Nanometre-scale germanium photodetector enhanced by a near-infrared dipole antenna," Nature Photonics, vol. 2, pp. 226-229.
Tang et al. (2010) "Highly efficient nonuniform grating coupler for silicon-on-insulator nanophotonic circuits," Optics Letters, vol. 35, pp. 1290-1292.
Travis et al. (2013) "Wedge optics in flat panel displays," Proceedings of the IEEE, vol. 101, pp. 45-60.
Van Steenberge et al. (2004) "MT-compatible laser-ablated interconnections for optical printed circuit boards," Journal of Lightwave Technology, vol. 22, pp. 2083-2090.
Vaughan et al. (2011) "Applications for embedded optic modules in data communications," White Paper, Avago Technologies, San José, CA, USA, 8 pp.
Wahl et al. (2103) "Energy-per-bit limits in plasmonic integrated photodetectors," IEEE Journal of Selected Topics in Quantum Electronics, vol. 19, pp. 3800210-3800210.
Wang et al. (2012) "High-performance solution-processed plasmonic Ni nanochain-Al2O3 selective solar thermal absorbers," Applied Physics Letters, vol. 101, 6 pp.
Wang et al. (2013) "Infrared absorption of n-type tensile-strained Ge-on-Si" Optics Letters, vol. 38, 4 pp.
Wang et al. (2013) "Large inherent optical gain from the direct gap transition of Ge thin films," Applied Physics Letters, vol. 102, 5 pp.
Wang et al. (2015) "High-performance infrared light trapping in nano-needle structured p+ SnOx (x≤1)/thin film n-Ge photodiodes on Si," Optics Letters, vol. 40(11), pp. 2603-2606.
Watts et al. (2011) "Vertical junction silicon microdisk modulators and switches," Optics Express, vol. 19, pp. 21989-22003.
Weiner et al. (1987) "Quadratic electro-optic effect due to the quantum-confined Stark effect in quantum wells," Applied physics letters, vol. 50, pp. 842-844.
Wilson (2011) "International technology roadmap for semiconductors," International Technology Roadmap for Semiconductors, 110 pp.
Xie et al. (2013) "960-km SSMF transmission of 105.7-Gb/s PDM 3-PAM using directly modulated VCSELs and coherent detection," Optics Express, vol. 21, pp. 11585-11589.
Zheng et al. (2008) "Optical proximity communication using reflective mirrors," Optics Express, vol. 16, pp. 15052-15058, 7 pp.
Zheng et al. (2010) "A sub-picojoule-per-bit CMOS photonic receiver for densely integrated systems," Optics Express, vol. 18, pp. 204-211.
Zheng et al. (2010) "Ultra-low-energy all-CMOS modulator integrated with driver," Optics Express, vol. 18, No. 3, pp. 3059-3070.
Zilkie et al. (2012) "Power-efficient III-V/Silicon external cavity DBR lasers," Optics Express, vol. 20, pp. 23456-23462.
Zou et al. (2014) "High-Performance, High-Index-Contrast Chalcogenide Glass Photonics on Silicon and Unconventional Nonplanar Substrates," Adv. Opt. Mater., vol. 2, pp. 478-486.
Zou et al. (2014) "Solution processing and resist-free nanoimprint fabrication of thin film chalcogenide glass devices: inorganic-organic hybrid photonic integration," Adv. Opt. Mater., vol. 2, pp. 759-764.

\* cited by examiner

METHOD AND APPARATUS OF SURFACE-INCIDENT, PLASMON-ENHANCED MULTIPLE QUANTUM WELL MODULATORS AND OPTICAL COUPLING THEREON

CROSS-REFERENCE TO RELATED APPLICATIONS

The present application claims priority to U.S. Provisional Patent Application No. 62/472,536 filed 16 Mar. 2017, the entire contents of which are incorporated herein by reference.

STATEMENT REGARDING FEDERALLY SPONSORED RESEARCH OR DEVELOPMENT

This invention was made with government support under DE-AR0000847 awarded by the Advanced Research Projects Agency-Energy (ARPA-E). The government has certain rights in the invention.

BACKGROUND

As the speed of computing electronics increases, optical interconnect may replace electrical interconnect between separate chips, or integrated circuit, within modules, or between modules and subsystems of each data center. Among other reasons for considering optical interconnect is that modulated optical signals can be directed over considerable and varied distances at a same power consumption and little crosstalk while electrical interconnect has power demands dependent on interconnect length-dependent capacitance and significant potential for crosstalk.

Use of optical interconnect requires generation, routing, and detection of digitally-modulated optical signals.

Direct modulation of Vertical-Cavity Surface-Emitting Lasers (VCSELs), an approach broadly adopted for off-chip and off-board interconnect at board and rack levels of computing equipment, becomes energetically unfavorable as single channel data rate increases because of the need to switch the voltages and currents such lasers require.

A leading alternative to direct modulation is the use of optical photonic modulators in VCSEL—Photonic Modulator—Waveguide—Detector interconnect configurations.

Photonic modulators can be important optoelectronic devices in photonic datalinks and optical communications where they modulate the intensity and/or the phase of the light, encoding optical signals.

There are generally two types of photonic modulators: (1) electro-optical modulators (EOM), in which the real part of the refractive index is changed ($\Delta n$) when a voltage/electric field is applied on the device; (2) electro-absorption modulators (EAMs), in which the imaginary part of the refractive index ($\Delta k$)/absorption coefficient ($\Delta \alpha = 4\pi \Delta k / \lambda$ where $\lambda$ is the wavelength of the light) is changed when a voltage/electric field is applied on the device. Most existing modulators use one of these two mechanisms.

Photonic datalinks and electrical-optical integration in data centers and optical communications requires modulators with low driving voltage, small footprint, low energy consumption, higher extinction ratio (ER, an on/off contrast ratio), and easy optical coupling/integration. EAMs usually have advantages over EOMs in terms of footprint, driving voltage, and power consumption.

Photonic modulators have been demonstrated with modulation rates as high as 500 Gb/s. Surface-incident EAMs, where the incoming light is incident on the surface of the device, are easier to integrate with photonic circuits and datalinks than their waveguide counterparts, therefore are ideal for large scale integration and deployment.

SUMMARY

An optical interconnect system has first and second waveguides each with wedge-shaped cross-section at a first end, disposed over an optical modulator. The optical modulator is a surface-plasmon multi quantum well (SP-MQW) modulator, the first waveguide an input waveguide and the second waveguide configured an output waveguide. In embodiments the SP-MQW modulator has multiple semiconductor layers positioned atop a lower metal layer between 10 and 300 nanometers thick and configured such that incident light is reflected at the lower metal layer unless a voltage is applied to the semiconductor layers, when incident light is coupled into a surface plasmon mode in the lower metal layer.

A surface-incident, plasmon-enhanced, multiple quantum well optical modulator has a multiple quantum well structure comprising at least two layers of two different semiconductor materials; at least one metallic layer adjacent to said multiple quantum well structure; at least one dielectric layer on top of said multiple quantum well structure; and at least a second dielectric layer underneath said multiple quantum well; said second dielectric layer having a different refractive index from said first dielectric layer. The modulator also has said metal layer being also adjacent to one of said dielectric layers; where light is incident through one of said dielectric layers with a higher refractive index on one surface of said multiple quantum well; the incidence angle being large enough to allow total internal reflection at a second surface of said multiple quantum well when no voltage is applied on said modulator structure; while applying a voltage on said modulator structure changes the refractive index and absorption coefficient of said multiple quantum wells and couples the incident light into a surface plasmon (SP) mode propagating on the surface of said metal layer and/or into coupled modes between said surface plasmon mode and metal/MQW/metal guided modes.

A method of forming a surface-incident, plasma-enhanced multiple quantum well optical modulator structure includes forming a multiple quantum well structure comprising at least two layers of two different semiconductor materials; forming at least one metallic layer adjacent to said multiple quantum well; forming at least one dielectric layer on top of said multiple quantum well; forming at least a second dielectric layer underneath said multiple quantum well; said second dielectric layer has a different refractive index from said first dielectric layer; said metal layer being also adjacent to one of said dielectric layers; where light is incident through one of said dielectric layers with a higher refractive index on one surface of said multiple quantum well; the incidence angle being large enough to allow total internal reflection at a second surface of said multiple quantum well when no voltage is applied on said modulator structure; while with a voltage applied on said modulator structure refractive index changes and couples a part of the incident light into a surface plasmon mode propagating on the surface of said metal layer and/or into coupled modes between said surface plasmon mode and metal/MQW/metal guided modes, thereby reducing the reflection.

DETAILED DESCRIPTION OF THE EMBODIMENTS

We disclose a Surface-incident, Plasmon-enhanced Multiple Quantum Well modulator (SP-MQW) and its optical coupling scheme. These modulators will be used in computers and data centers to achieve highly energy-efficient optical interconnects to transport information from one computer chip to another.

Figure 2:
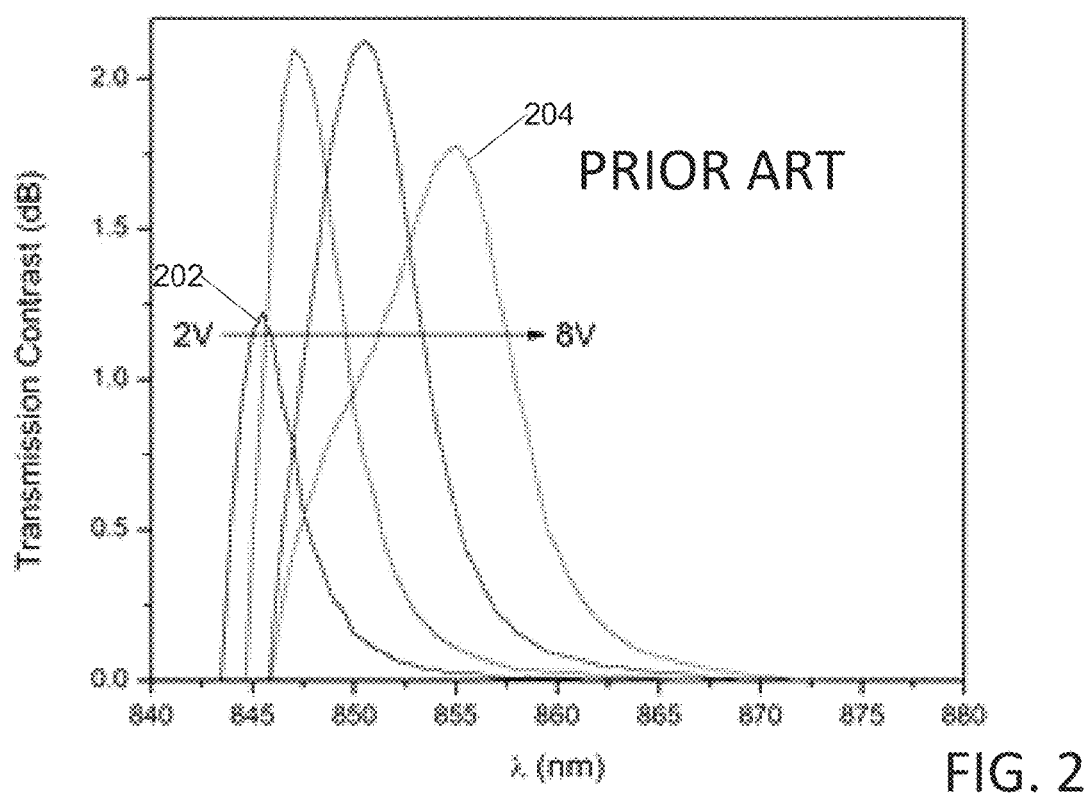
FIG. 2 illustrates PRIOR ART transmission contrast ratio vs. wavelength at different driving voltages for state-of-the-art, conventional surface-incident electro-absorption modulators (EAMs).

Conventional surface-incident EAM modulators suffer from limited extinction ratio and/or high driving voltage due to the limited absorption per unit thickness. For example, even though a large absorption coefficient change of absorption coefficient Δα>5,000 cm$^{-1}$ can be obtained in Al$_{0.32}$Ga$_{0.64}$As (10 nm)/GaAs (10 nm) QWs under a 70 kV/cm electric field, to achieve 7 dB extinction ratio the thickness of the MQW stack has to be greater than 1.5 μm. This leads to a driving voltage of 70 kV/cm×1.5 μm~10 V, too high for complimentary metal-oxide semiconductor (CMOS) circuitry of modern high-performance processor integrated circuits to handle without relaxed design rules and, in some cases, extra processing steps for high voltage transistors. Modern CMOS circuits require driving voltages are below 1.5 V. The high driving voltage also leads to high power consumption, which is proportional to voltage squared. Furthermore, even with such a high driving voltage, the contrast ratio is still very limited in state-of-the-art surface-incident EAMs, as illustrated in FIG. 2 where wavelength dependence of contrast 202 at 2V is compared with wavelength dependence at higher voltages, including at 8V 204. In the prior surface-incident EAM, of FIG. 2, the extinction ratio did not exceed 2 dB even at 8V driving voltage in this case.

Figure 3:
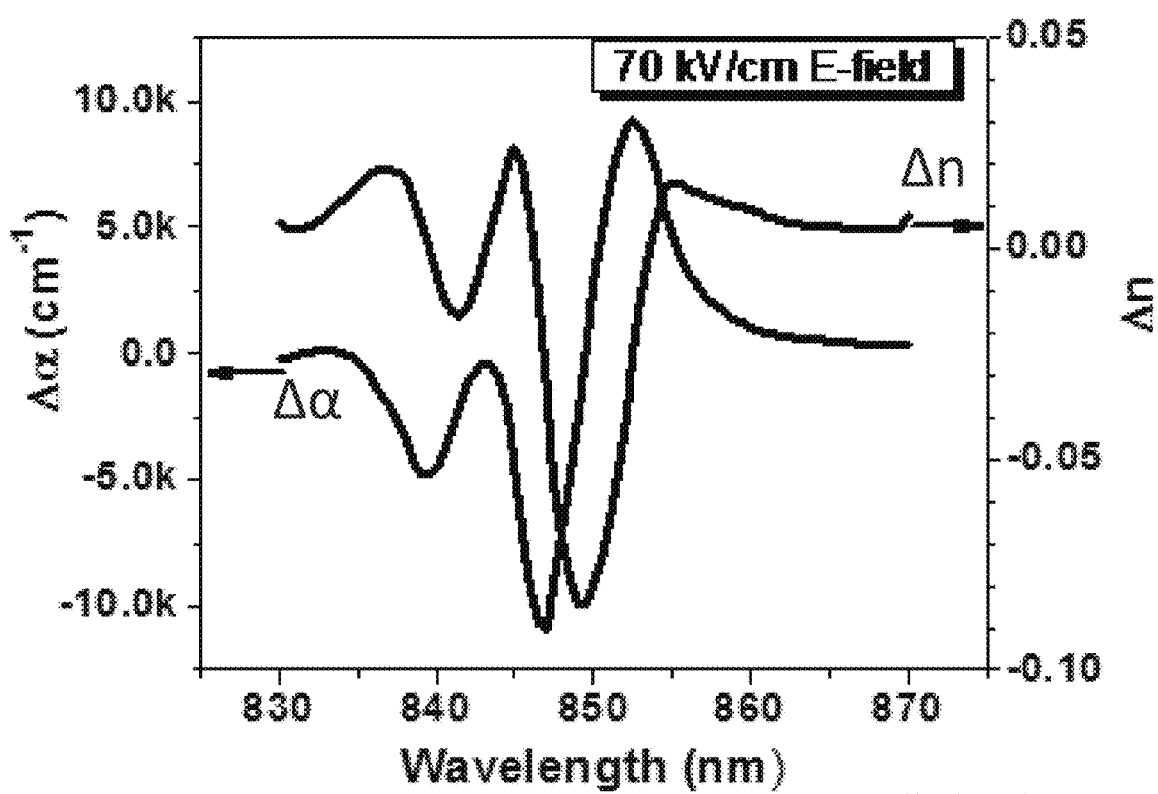
FIG. 3 illustrates changes in absorption coefficient Δα and refractive index Δn in Al0.32Ga0.64As (10 nm)/GaAs (10 nm) quantum wells (QWs) under 70 kV/cm electric field.
Figure 4:
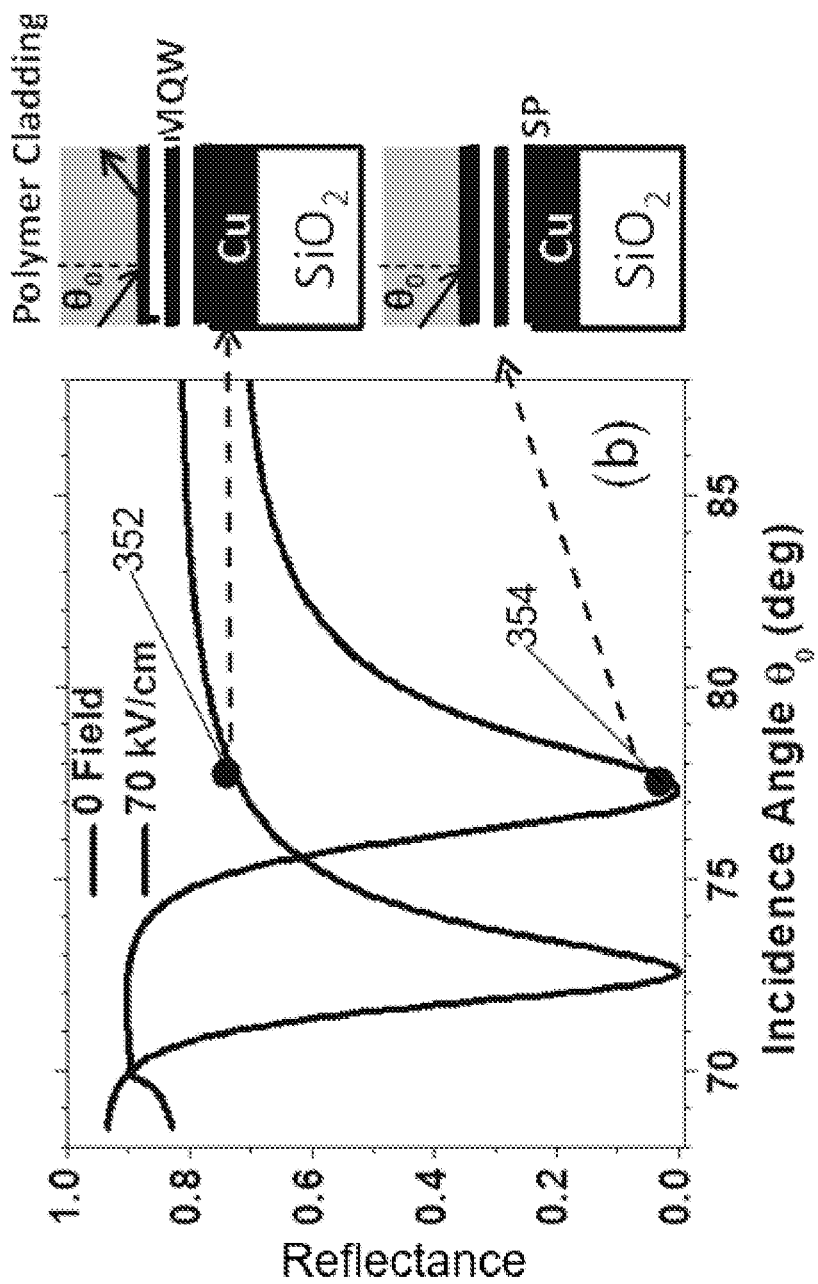
FIG. 4 illustrates schematic Surface Plasmon Enhanced (SP)-Multiple Quantum Well modulator (MQW) (SP-MQW) structures (right) and simulated reflectance as a function of incidence angle under 70 kV/cm field (left) using the Al0.32Ga0.64As (10 nm)/GaAs (10 nm) MQW structure.

To address the challenges in low driving voltage and high extinction ratio, in this invention we synergistically utilize both refractive index Δn and absorption coefficient Δα (FIG. 3) in a MQW modulator via surface plasmon coupling (FIG. 4). As shown in FIG. 3, according to Kramer-Kronig relation, the change in absorption coefficient Δα upon the application of an electric field/voltage will also induce a significant change in refractive index Δn. In this embodiment, we use Al$_{0.32}$Ga$_{0.64}$As (10 nm)/GaAs (10 nm) QWs as an example. The Δα under an applied electric field is induced by the quantum confined Stark effect (QCSE). While conventional EOMs typically achieves a Δn of ~0.001 under an applied electrical field of ~100 kV/cm, here we can achieve a much larger Δn=−0.08 at λ=850 nm (FIG. 3) under the 70 kV/cm field due to the large Δα in the wavelength range nearby, almost 100× greater than conventional EOMs.

Figure 5:
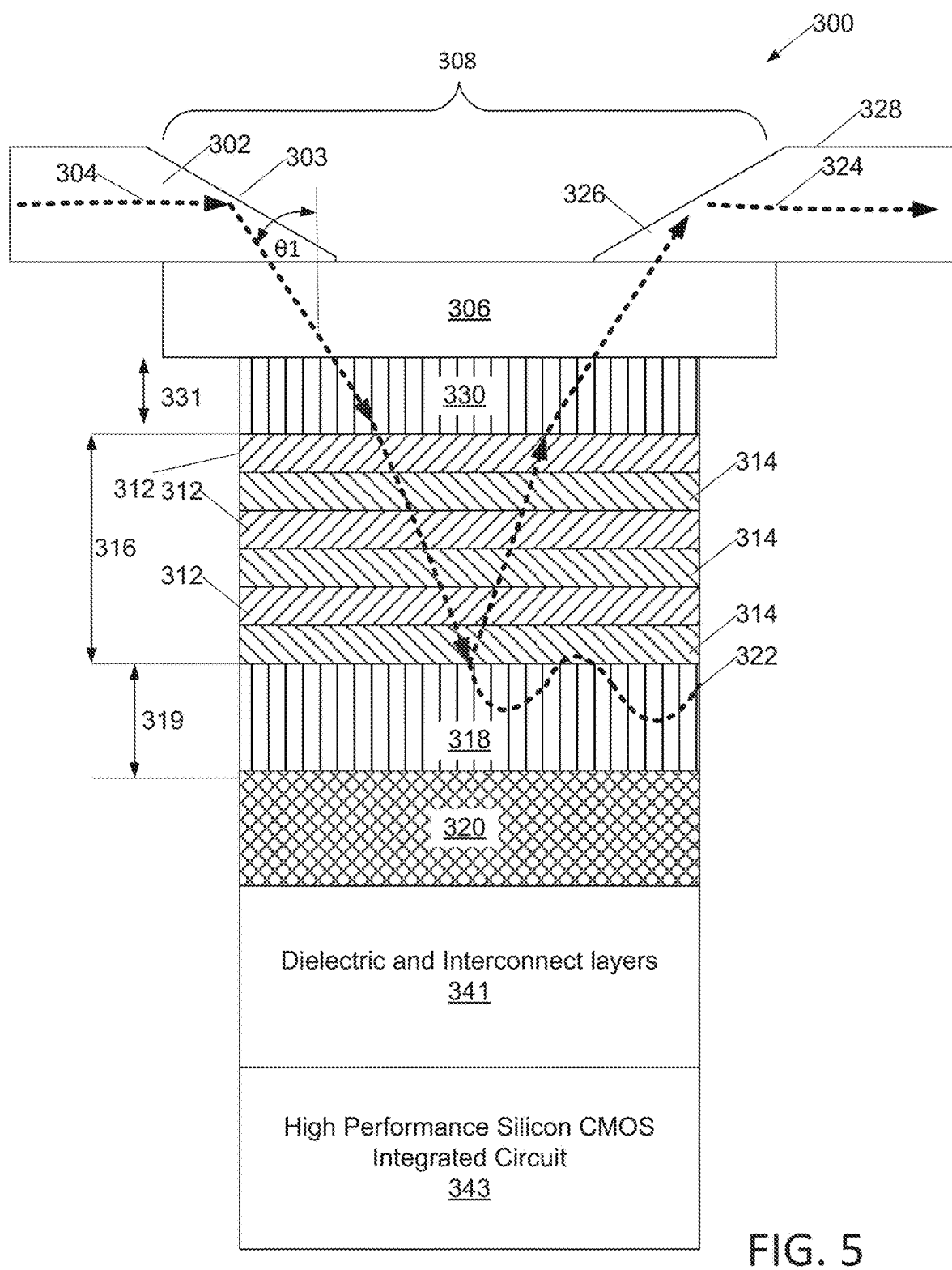
FIG. 5 is a cross sectional diagram of an embodiment of the Multiple Quantum Well MQW/metal SP-MQW structure.

The corresponding device structure 300 of the SP-MQW is shown in FIG. 5 The MQW has two different types of semiconductor materials with different band gaps.

In an embodiment, incident light from a laser diode, in a particular embodiment a VCSEL laser, that may be located on or off a digital integrated circuit (chip) is coupled into an incident-light waveguide 302 (FIG. 5). Incident light waveguide 302 routes the incident light, symbolized by arrows 304, to a wedge coupler 303 diverting it downwards through transparent a transparent dielectric 306 into the SP-MQW device 308 at an angle of incidence θ$_1$. The MQW device has alternating layers of first semiconductor 312 and second semiconductor 314.

Suppose semiconductor 312 is the quantum well (QW) while semiconductor 314 is the barrier to confine the electrons in semiconductor 312, then the band gap of semiconductor 312 has to be smaller than that of semiconductor 314. The thickness of each layer in the MQW structure is less than 50 nanometers (nm). In one embodiment, semiconductor 312 is Gallium Arsenide (GaAs) and semiconductor 314 is an Aluminum Gallium Arsenide (Al$_{0.32}$Ga$_{0.64}$As). In another embodiment, semiconductor 312 is Indium Gallium Arsenide (InGaAs), Indium Gallium Arsenide Phosphide (InGaAsP), Aluminum Gallium Arsenide (AlGaAs) or other alloys having similar properties; semiconductor 314 can be Aluminum Gallium Arsenide (AlGaAs) of other dopings and/or compositions. In an embodiment, the alternating semiconductor layers 312, 314 of the MQW total thickness 316 about 100-900 nm in thickness and in a particular embodiment 200 nm. In other embodiments, the MQW structure is substituted with a uniform semiconductor thin film instead of multiple layers, and the Δα under an applied electric field is induced by Franz-Keldysh effect.

A thin metal layer 318 of less than 150 nm thickness 319 is formed at the bottom of the MQW. In one embodiment, the metal is copper (Cu), a metal that can undergo plasmon interactions with photons. In other embodiments, the metal is Titanium (Ti), Gold (Au), Aluminum (Al), Nickel (Ni), Cobalt (Co), or another metal alloy that can undergo plasmon resonance interactions with photons. Dielectric layer 306 has refractive index n$_1$ and is formed on top of the MQW, while another dielectric layer 320 with refractive index n$_2$ is formed under the metal layer. Here n$_1$>n$_2$. The dielectric materials are chosen from but not restricted to polymers, Silicon Dioxide glass (SiO2), Silicon OxyNitride (SiOxNy), Silicon Nitride (SiNx), and air.

During device operation, light is incident on the top surface of the MQW at an incidence angle of θ$_1$>arcsine (n$_2$/n$_1$). This angle θ1 is also within 60 degrees of the incidence angle for optical coupling into the surface plasmon (SP) mode of metal layer 318, Op. That is, |θ1−θp|<60 degrees. Note that Op is determined by the refractive indices and thicknesses of the MQW, the metal layer, dielectric layer 306, and dielectric layer 320. When the refractive index of the MQW is changed through operation of Δn under an applied electric field, Op can be shifted to $\theta_1$ to achieve optical extinction by coupling incident light into the SP mode 322 that propagates along the metal surface rather than being reflected. In one embodiment in FIG. 4, $\theta_1$=77.4 degrees; $\theta p_1$=72.5 degrees without the applied electric field, and it is shifted to $\theta p_2$=$\theta_1$=77.4 degrees when an electric field of 70 kV/cm is applied on the MQW structure. Incident light 304 is largely reflected as output light 324 by the semiconductor 314-metal 318 interface without the electric field, but with the electric field generation of surface plasmons from photons absorbs energy and reduces reflected output light 324. Generation of these plasmons increases extinction of output reflected light 324, thereby increasing the extinction ratio ER.

Output reflected light 324 is captured by a second wedge coupler 326 and diverted into output waveguide 328, from whence it may be routed through optical interconnect, either chip-chip or chip from module to module to chip, to an optical receiver, not shown.

The SP-MQW device is built atop a digital integrated circuit. Beneath the lower dielectric layer 320 are interconnect and metallization layers 341, and semiconductor layers 343, of the underlying high performance digital CMOS integrated circuit.

There are two major benefits of the disclosed SP-MQW modulator structure:

(1) Without the applied field, the incident light essentially experiences total internal reflection at the MQW/metal interface, with little or no coupling to the lossy surface plasma mode, leading to less than 1.5 dB insertion loss (IL) (352 in FIG. 4, where the reflectance is ~80%).

(2) With the applied electric field inducing a large refractive index change in the MQW (Δn~−0.08); the light is largely coupled to a surface plasma mode (SP) mode that propagates along the surface of the metal. Correspondingly, the reflectance is minimized and a high ER is achieved 354 in FIG. 4, where the reflectance is ~0. This way, we use the plasmonic loss to our advantage. Most importantly, the optical decay tail in the MQW is <40 nm, meaning that even a 100 nm-thick MQW stack can fully confine the SP mode and induce a large ER upon SP coupling, thereby allowing a low driving voltage of 0.7 V to achieve 70 kV/cm electric field (=0.7 V/100 nm). This <1 V driving voltage is fully compatible with low-power CMOS driving circuitry such as that on modern, high performance, processor chips. Compared to the existing art, the driving voltage is decreased by ~10×, the energy consumption by ~100×, and the extinction ratio increased from 2 dB to >15 dB (FIG. 6) where unbiased reflection 360 shows a small injection loss, and SP-enhanced reflection 362 shows a much higher 362 injection loss for single or multi-mode waveguide operation.

Figure 6:
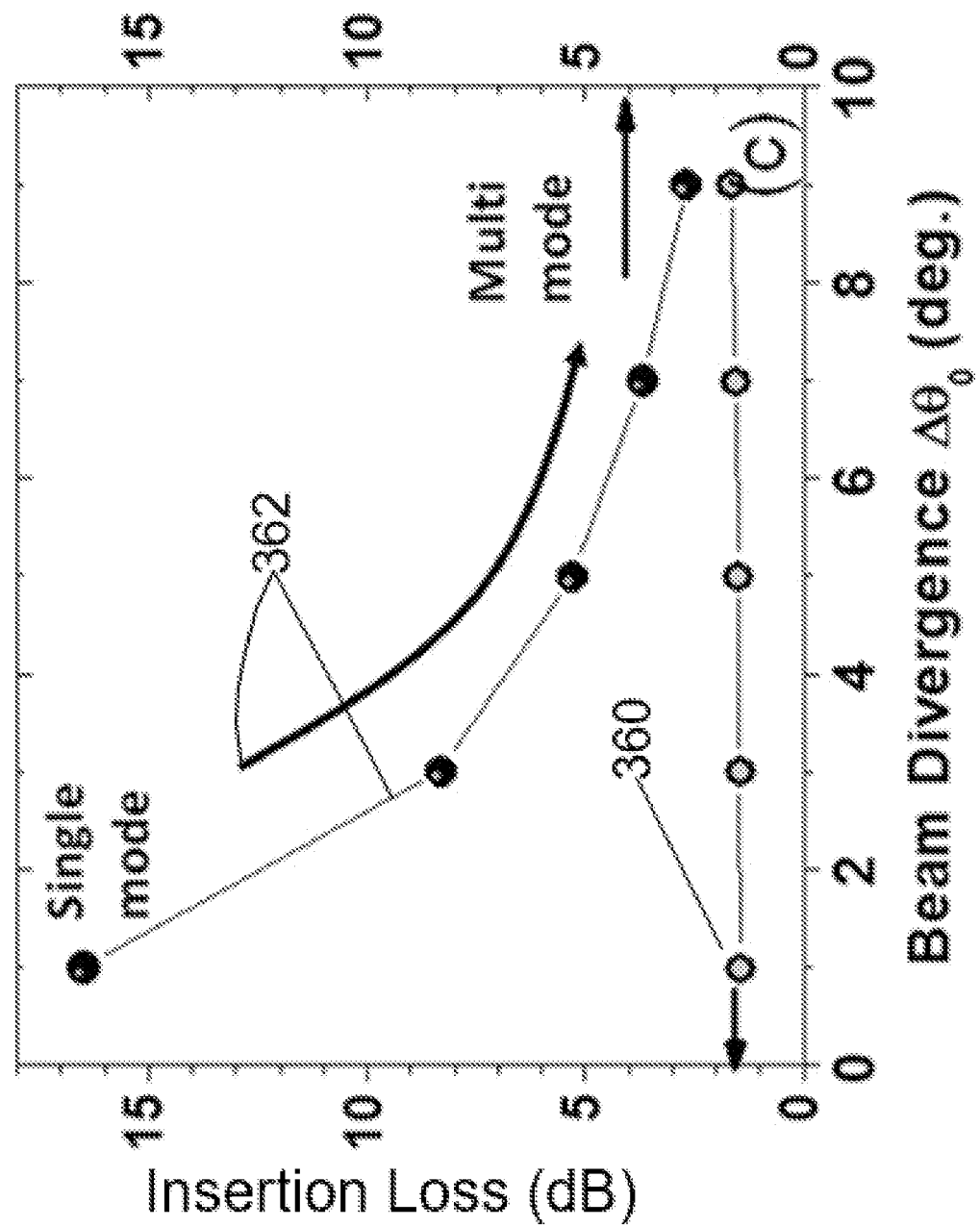
FIG. 6 illustrates dependence of IL and ER of the SP-MQW modulator on incident beam divergence angles.

In the preliminary design modeling shown in FIG. 4, the reflectance is reduced from 80% to 0 at the optimal incidence angle under the applied field, with an angular divergence of $\Delta\theta_1$~1°. This angular divergence is easily satisfied by single-mode incident light which has $\Delta\theta_0$<1° divergence. As shown in FIG. 6, a very high extinction ratio exceeding 16 dB can be achieved for a beam divergence of $\Delta\theta_0$=10 at <1.5 dB insertion loss. The high extinction ratio suggests that the modulator design is also compatible with advanced modulation formats such as 4-level Pulse Amplitude Modulation (PAM-4) in addition to simple on-off keying. As the divergence angle increases, the insertion loss remains almost the same while the extinction ratio decreases. Considering that well-designed multi-mode waveguides can achieve $\Delta\theta_1$<5°, an ER >6 dB is still readily attainable, much larger than the state-of-the-art shown in FIG. 1 (ER=2 dB). Considering a 5×5 µm² device area and the 0.7 V driving voltage, the energy efficiency is as high as 3.6 fJ/bit, more than 100× better than existing art. This can be further increased with optimized design of the MQW/metal/dielectric stack. The RC limited 3 dB bandwidth is as high as 100 GHz assuming 50Ω load, which can be increased further since the load resistance can be less than 50Ω for optical interconnects.

In a particular embodiment, in order to further enhance ER, an upper copper layer 330 is added between upper dielectric 306 and semiconductor layers 312, 314 of the MQW device. In this embodiment, the upper metal layer 330 is between 10 and 100 nanometers thickness 331, and in a particular embodiment 30 nanometers. Similarly, the lower metal layer 318 is between 10 and 200 nm, and in a particular embodiment 50 nm, thick. In an embodiment, both metal layers 318 and 330 are copper, in an alternative embodiment lower metal layer 318 is $Cu_3Ge$, while Au is a good ohmic contact metal for MQWs.

Figure 7:
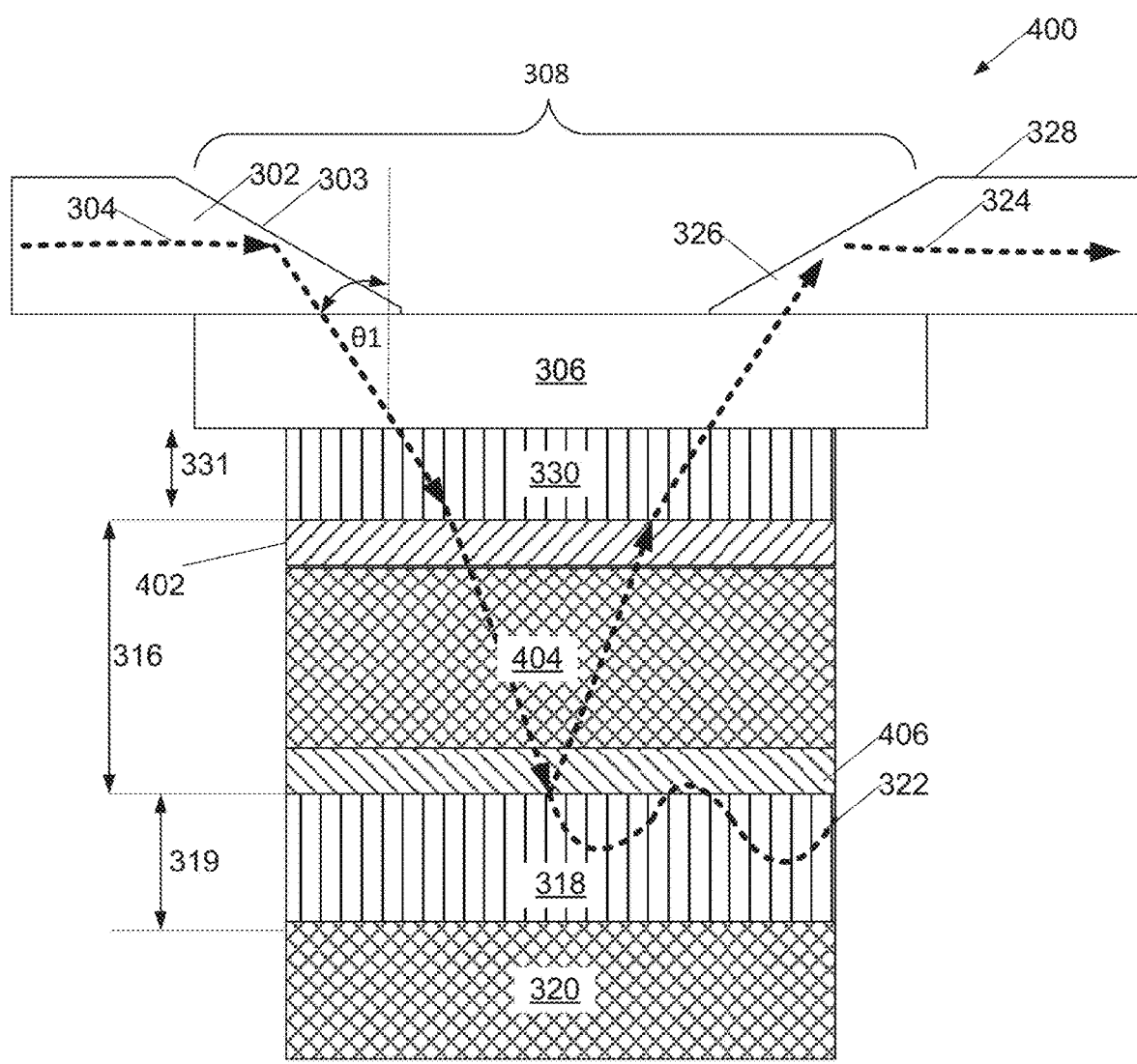
FIG. 7 is a cross sectional diagram of an alternative P-I-N MQW embodiment.

In an alternative embodiment 400 the top 402 and bottom 406 of the MQW structure is different diffused (FIG. 7); one is n-type and the other is p-type, while the center of the MQW is intrinsic 406, forming a P-I-N structure. Remaining features of alternative embodiment 400 are described with reference to FIG. 5. An electric field is established by applying a reverse bias across the P-I-N junction MQW structure.

Figure 8:
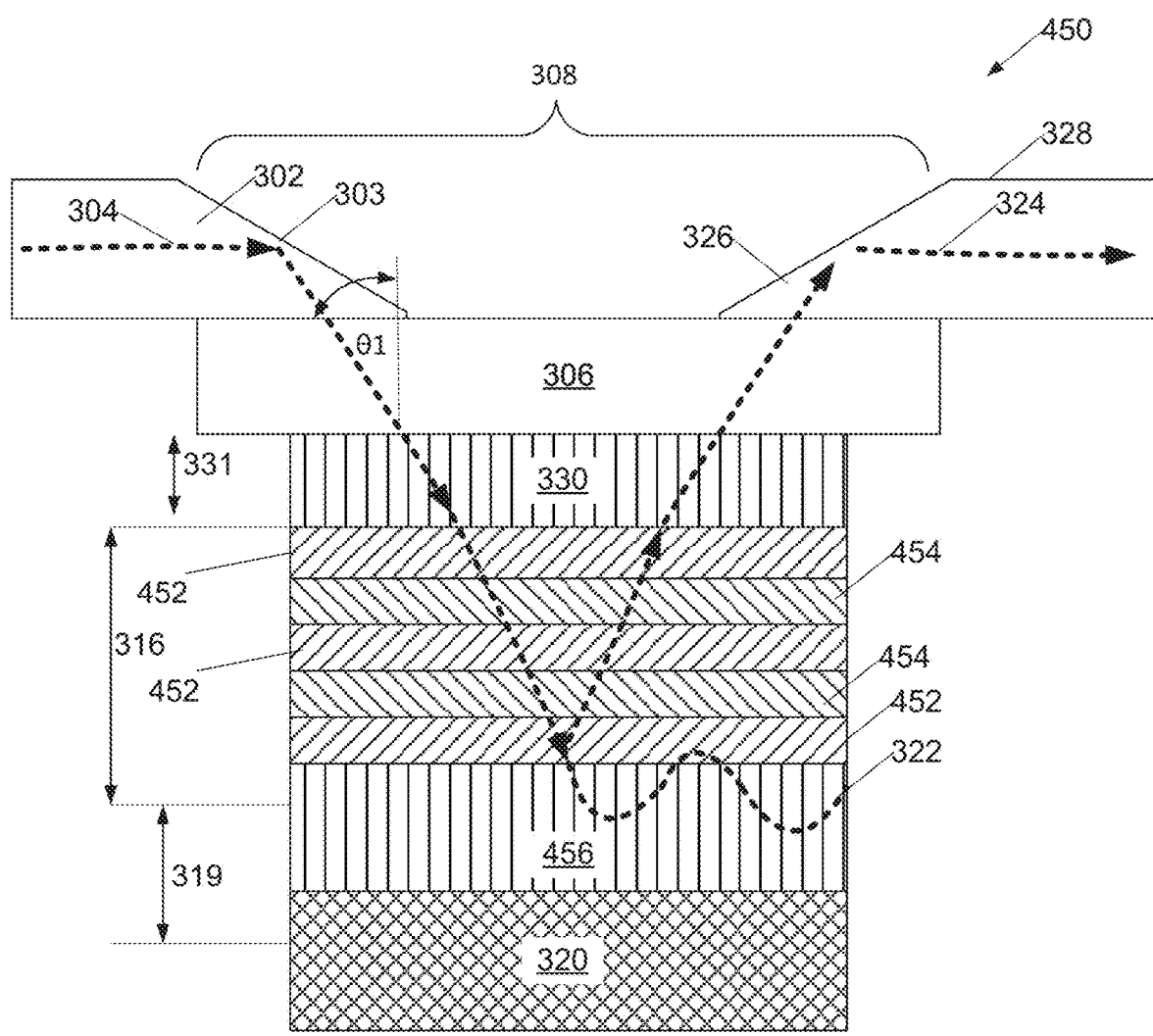
FIG. 8 is a cross sectional diagram of an alternative Schottky-barrier embodiment.

In another embodiment 450 (FIG. 8) with doped semiconductor layers 452, 454, the doped semiconductor electrode at the bottom is omitted, while the Schottky barrier between the metal 456 and the MQW is used to establish an electric field under reverse bias. Remaining features of alternative embodiment 450 are described with reference to FIG. 5.

Figure 1:
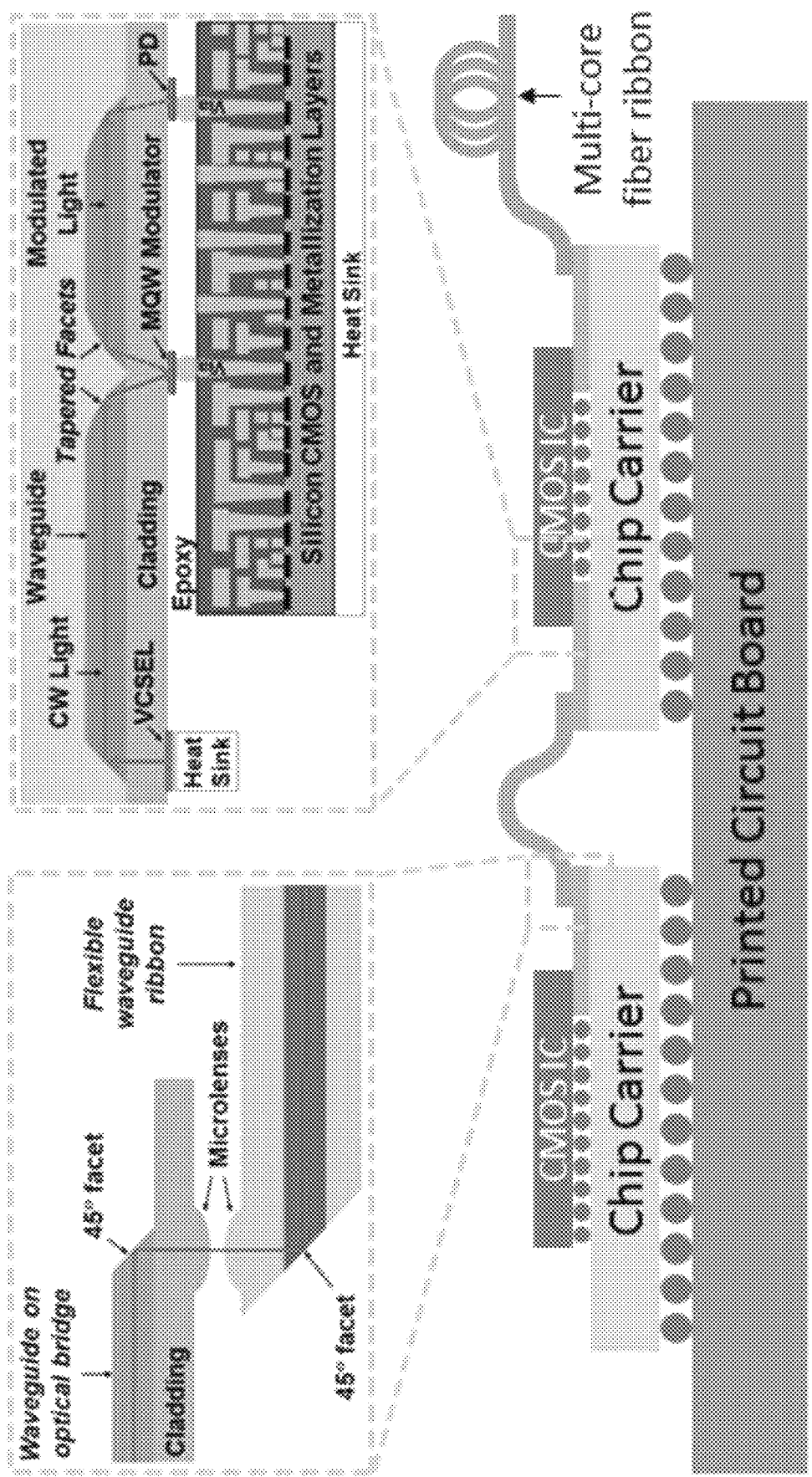
FIG. 1 illustrates an on-chip and intra-chip optical interconnection system.
Figure 9:
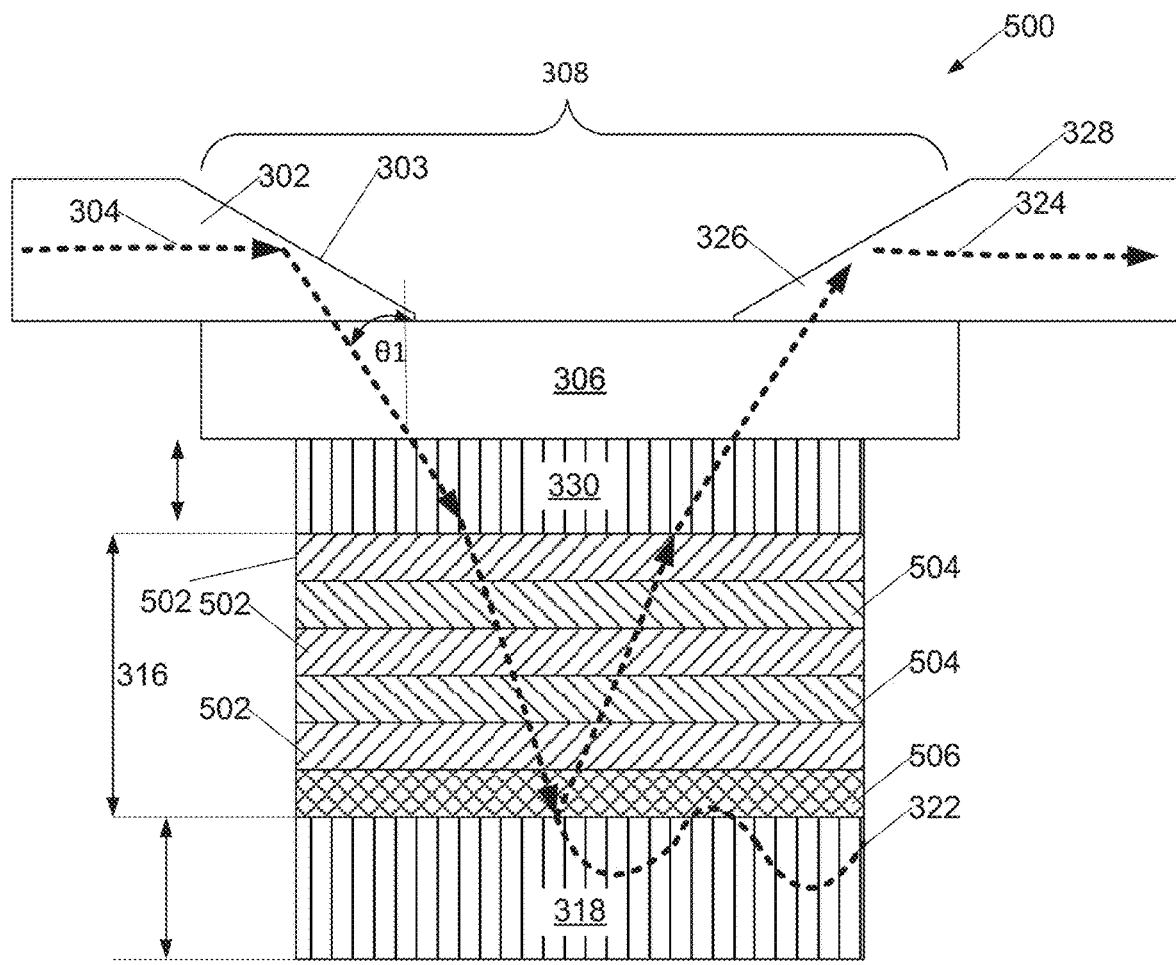
FIG. 9 is a cross sectional diagram of an alternative field-effect embodiment.
Figure 10:
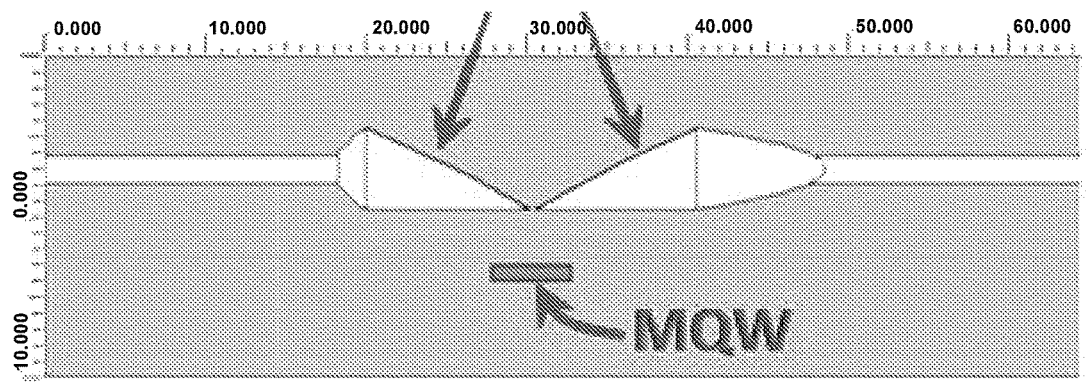
FIGS. 10-11 further detail an embodiment of the tapered facet coupling of a single optical mode to the SP-MQW. The schematic cross-section structure is shown in FIG. 10, while an optical simulation is shown in FIG. 11. A coupling efficiency greater than 85% can be achieved.
Figure 11:
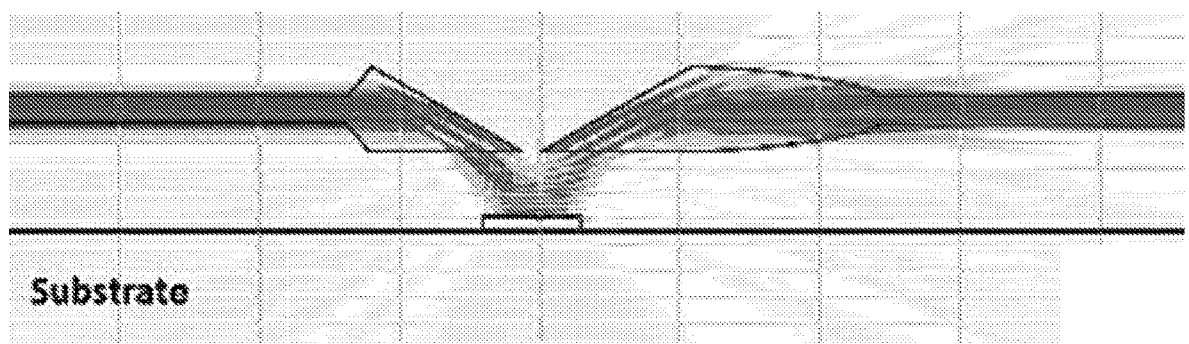

In still another embodiment 500 (FIG. 9), a thin dielectric insulator layer 506, such as $SiO_2$, $Al_2O_3$, or another oxide layer, with a refractive index of $n_3$ is inserted between the metal and the MQW N and P regions 502, 504 to form a metal-oxide-semiconductor (MOS) structure. An electric field is established in the MQWs under depletion mode the MOS structure (reverse bias). In this case, the dielectric layer $n_2$ may be omitted if $n_3$<$n_1$, as shown An embodiment of optical coupling to the SP-MQW and integration with the photonic datalink system is schematically shown in FIG. 1. The SP-MQW couples to waveguides of the device with high efficiency, as illustrated in FIG. 10-11. Here CMOS electronic integrated circuits (ICs) are bonded on chip carriers, which are mounted on printed circuit boards. Each CMOS electronic chip is connected to an optical chip/bridge on its edge. On the photonic chip/bridge, light emitted by a vertical cavity surface emission laser (VCSEL) is connected to a waveguide via a 45 degree facet (see the box on the right). In one embodiment, the waveguide is made of polymer material. In other embodiments, the waveguide is SiON, SiNx, Si or other dielectric materials. The light propagates in the waveguide, and when approaching the SP-MQW it is coupled to the modulator at a desirable incidence angle ($\theta_1$ in FIG. 8) via tapered facet couplers as shown in FIGS. 5 and 10-11. When no electric field is applied on the SP-MQW, the light incident on the SP-MQW is reflected via total internal reflection through a second tapered facet into the output waveguide. When an electric field is applied, the incident light is coupled to the surface plasmon mode on the surface of the metal layer due to the change in refractive index and the absorption coefficient in the MQW structure. Consequently, there is no reflected light coupled to the output waveguide. Therefore, the modulation of light intensity and optical encoding is implemented. Note that the SP-MQW structure can also be used as a photodetector (PD) with a similar coupling scheme. Both the SP-MQW and the PD are electrically connected to the silicon underlying CMOS chip.

At the edge of the photonic chip/bridge, the waveguide on the photonic bridge is coupled to a flexible waveguide ribbon via 45 degree reflector facets and microlenses (see the box on the top left of FIG. 3) so that optical signals can be transmitted from one chip to another.

Figure 12:
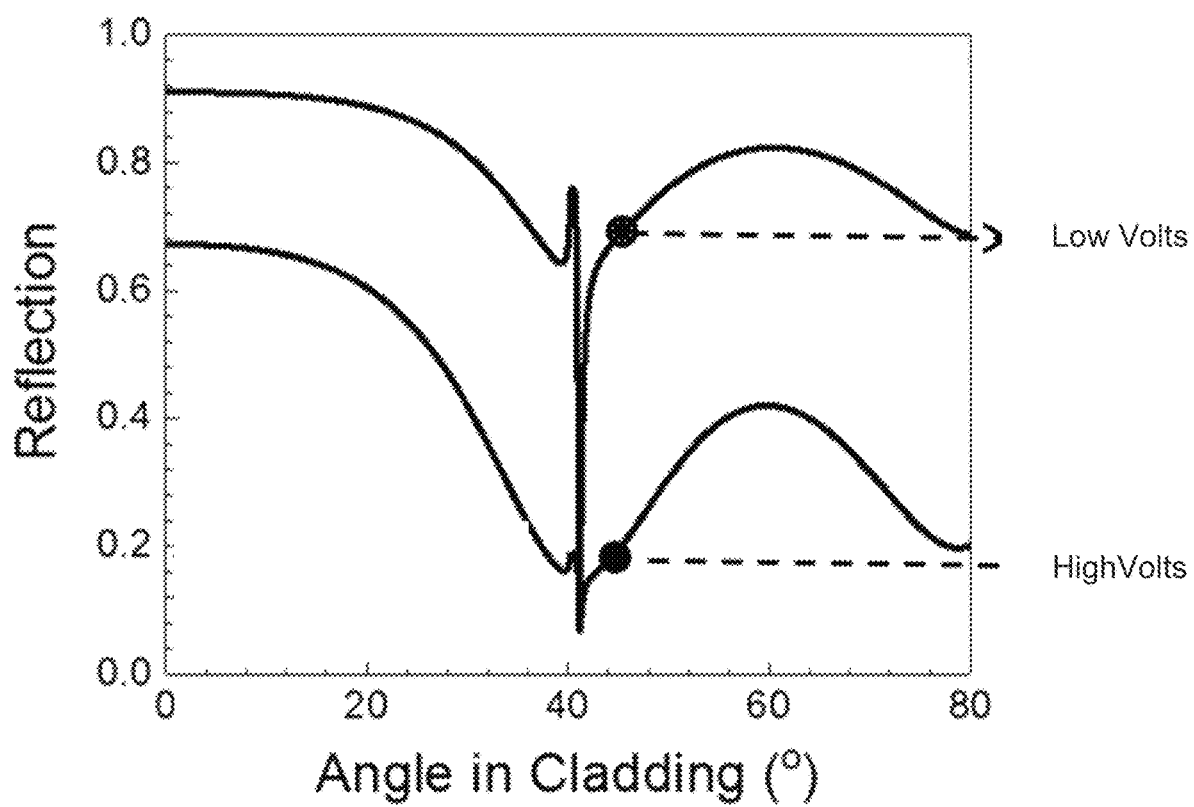
FIGS. 12 and 13 shows how extinction ratio and insertion loss vary with angle of incidence.

In a particular Schottky embodiment with the optional upper metal, as shown in FIG. 12, optimum angle of incidence is 41 degrees.

At incident angles smaller than the SP resonances, a low IL of 1.3-1.6 dB and a large ER of 5-7.5 dB can be achieved. Note that the 50 kV/cm difference in the high (70 kV/cm)/low field (20 KV/cm) corresponds to a low voltage swing of $V_{pp}=1$ V, thanks to the small thickness of the MQW layer (200 nm). Therefore, low IL and high ER can be achieved at a low driving voltage. FIG. 3b shows that the device could also work in some regimes with a larger incidence angle than the SP resonance. Therefore, this design also offers some flexibility and tolerance to angular divergence of the incident beam.

Extinction ratio and insertion loss of the double metal layer 30 nm Cu/200 nm MQW/50 nm Cu structure are discussed with reference to FIG. 12 at two different incident angle ranges. (a) 39-40.6 degrees and (b) 42-56 degrees are illustrated in FIG. 13.

Figure 13:
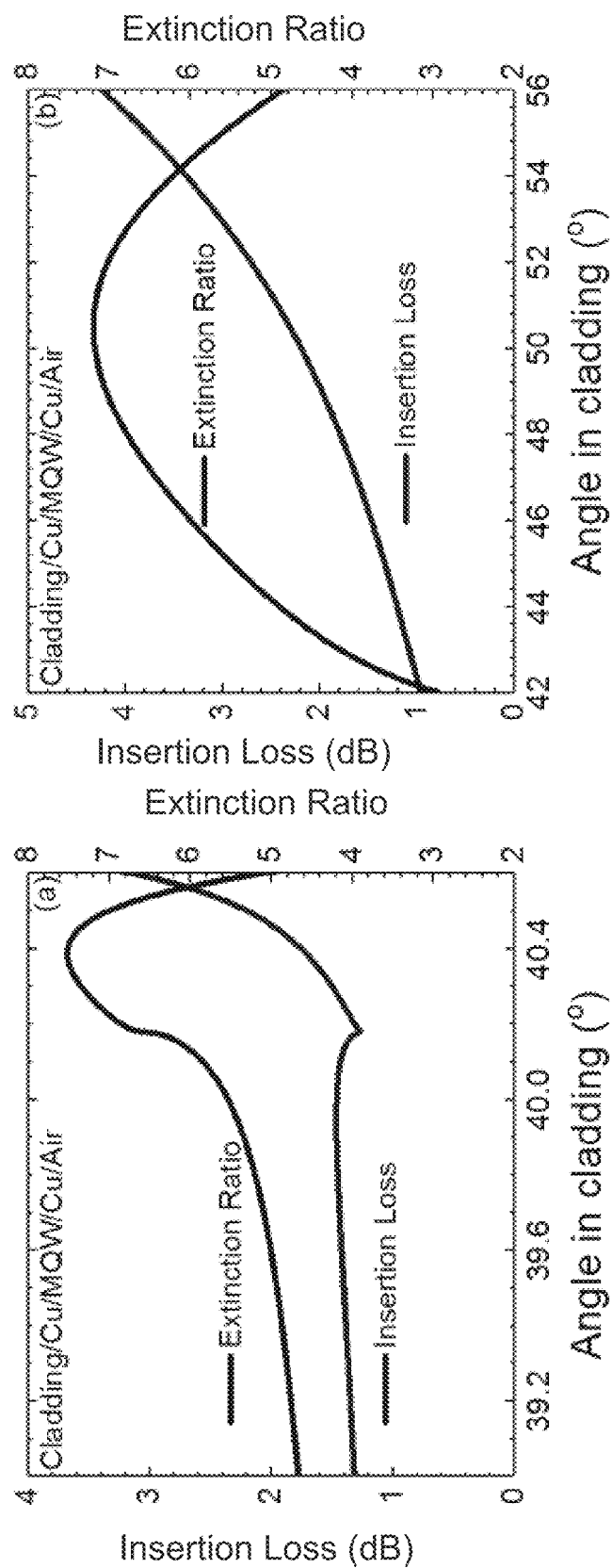

In an alternative embodiment, operation in the range illustrated in either range (a) or range (b) of FIG. 13 is used.

Key Advantages Compared to Existing Arts

Compared to conventional structures without surface plasmon assistance, key novel features are summarized in the table below. The performance is drastically better than prior surface incident modulators.

| Key Performance Parameters | SP-MQW modulator in this Invention | Prior Surface-incident Modulators |
|---|---|---|
| Extinction Ratio (the higher the better) | >15 dB | <3 dB |
| Driving Voltage (the lower the better) | 0.7-1 V | >5 V |
| Energy Consumption (the lower the better) | 1-10 fJ/bit | 500-1000 fJ/bit |

We envision that the proposed technology has great potential to be deployed in the form of electronic-photonic co-packaged chipsets for high bandwidth-demanding chip-to-chip as well as chip-to-connector communications. High performance server systems and hyper-scale data center switching systems are among first potential adopters of our technology. The trend of transitioning from system faceplate pluggable optical modules to on-board optical modules is steadily progressing from IBM's pioneering attempt in their P775 supercomputer systems to the fast-moving and influential COBO (Consortium for On-Board Optics) founded and supported by a number of major players in the industry. With the ever-growing demands for bandwidth density within a manageable power budget, the next logical step is clearly to move optics even closer to electronics by realizing electronic-photonic co-packaging in one chipset.

We are convinced that the key components adopted in our interconnect scheme, such as the disclosed SP-MQW modulator, provides solid cost and manufacturability advantages of our proposed technology in a commercial setting. Based on prior cost analysis of hybrid integrated optical transceiver module, the two major cost factors are active optoelectronic component and sub-assembly costs as well as system packaging and assembly, contributing to 54% and 36% respectively of the final module cost. Our proposed technology can significantly reduce costs associated with both components and packaging. The use of surface normal optical chips such as VCSELs, SP-MQW modulators and PDs are made by semiconductor processes on 6" GaAs wafers. In the fiber optics industry, by taking advantage of a nearly $10B GaAs IC ecosystem (the 3rd most maturely developed IC ecosystem after Si and SiGe), GaAs-based chips and solutions (mainly for short-reach applications) claim nearly one order of magnitude lower cost than their InP counterparts and already achieved $1/Gb/s half a decade ago. The use of surface normal devices is the key to reaching the $0.1/Gb/s target. Costs of surface normal chips (e.g. VCSELs) have consistently been a fraction of those of their waveguide coupled counterparts (e.g. DFB) over the past 20 years due to larger wafer size (6" GaAs vs. 2-3" InP), much higher processing yield, and significant cost savings on testing (wafer level vs. individual edge tests). It is also cheaper than Si photonics which still requires hybrid integration of expensive DFB lasers. High-volume pricing of commercial VCSELs is now below $0.05/Gb/s (even lower with one DC VCSEL powering multiple channels) and the costs of MQW modulators and PDs are minimal due to simpler epi-structures. The polymer waveguides can be made via an industrially validated low-cost roll-to-roll imprint process. The material platforms, fabrication methods and packaging scheme define a clear path to the $0.1/Gb/s cost target.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. It is also anticipated that steps of methods may be performed in an order different from that illustrated and still be within the meaning of the claims.

What is claimed is:

1. An optical interconnect system comprising a first and a second waveguide each having wedge-shaped cross-section at a first end, the first and second waveguide attached to a surface of an integrated circuit with the first end disposed over an optical modulator;
    wherein the optical modulator is a surface-plasmon multi quantum well (SP-MQW) modulator, the first waveguide configured as an input waveguide to the SP-MQW modulator and the second waveguide configured as an output waveguide from the SP-MQW modulator; and wherein the SP-MQW modulator comprises a plurality of semiconductor layers disposed atop a lower metal layer between 10 and 300 nanometers thick and configured such that incident light is reflected at the lower metal layer unless a voltage is applied to the semiconductor layers, whereupon incident light is coupled into a surface plasmon mode in the lower metal layer.

2. The optical interconnect system of claim 1 wherein the lower metal layer comprises at least one of the group consisting of copper (Cu), Titanium (Ti), Gold (Au), Aluminum (Al), Nickel (Ni), and Cobalt (Co).

3. The optical interconnect system of claim 2 wherein the lower metal layer lies atop a lower dielectric layer.

4. The optical interconnect system of claim 3 further comprising an upper dielectric layer atop the semiconductor layers.

5. The optical interconnect system of claim 3 further comprising an upper dielectric layer atop the upper metal layer, the upper and lower dielectric layers having different refractive index.

6. The optical interconnect system of claim 1 further comprising an upper metal layer deposited atop the semiconductor layers, the upper metal layer between 10 and 100 nanometers thick.

7. A surface-incident, plasmon-enhanced, multiple quantum well optical modulator comprising:
   a multiple quantum well structure comprising at least two layers of two different semiconductor materials;
     at least one metallic layer adjacent to said multiple quantum well structure;
     at least one dielectric layer on top of said multiple quantum well structure;
   at least a second dielectric layer underneath said multiple quantum well; said second dielectric layer having a different refractive index from said first dielectric layer;
     said metal layer being also adjacent to one of said dielectric layers; where
   light is incident through one of said dielectric layers with a higher refractive index on one surface of said multiple quantum well; the incidence angle being large enough to allow total internal reflection at a second surface of said multiple quantum well when no voltage is applied on said modulator structure; while
   applying a voltage on said modulator structure changes the refractive index and absorption coefficient of said multiple quantum wells and couples the incident light into at least one mode selected from the group consisting of a surface plasmon mode propagating on the surface of said metal layer and coupled modes between said surface plasmon mode and metal/MQW/metal guided modes.

8. A method of forming a surface-incident, plasma-enhanced multiple quantum well optical modulator structure comprising:
   forming a multiple quantum well structure comprising at least two layers of two different semiconductor materials;
     forming at least one metallic layer adjacent to said multiple quantum well;
     forming at least one dielectric layer on top of said multiple quantum well;
   forming at least a second dielectric layer underneath said multiple quantum well; said second dielectric layer has a different refractive index from said first dielectric layer;
     said metallic layer being also adjacent to one of said dielectric layers; where
   light is incident through one of said dielectric layers with a higher refractive index on one surface of said multiple quantum well; the incidence angle being large enough to allow total internal reflection at a second surface of said multiple quantum well when no voltage is applied on said modulator structure; while with a voltage applied on said modulator structure refractive index changes and couples a part of the incident light into at least one mode selected from a surface plasmon mode propagating on the surface of said metal layer and coupled modes between said surface plasmon mode and metal/MQW/metal guided modes, thereby reducing the internal reflection.

* * * * *